March 27, 1945.  A. P. DRDA  2,372,261
METALLIC ARC WELDING
Filed July 16, 1941  3 Sheets-Sheet 1

INVENTOR.
ALOIS P. DRDA

March 27, 1945.　　　A. P. DRDA　　　2,372,261
METALLIC ARC WELDING
Filed July 16, 1941　　　3 Sheets-Sheet 2
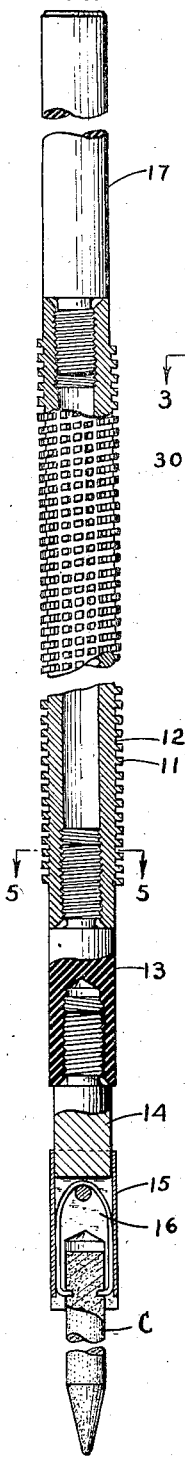
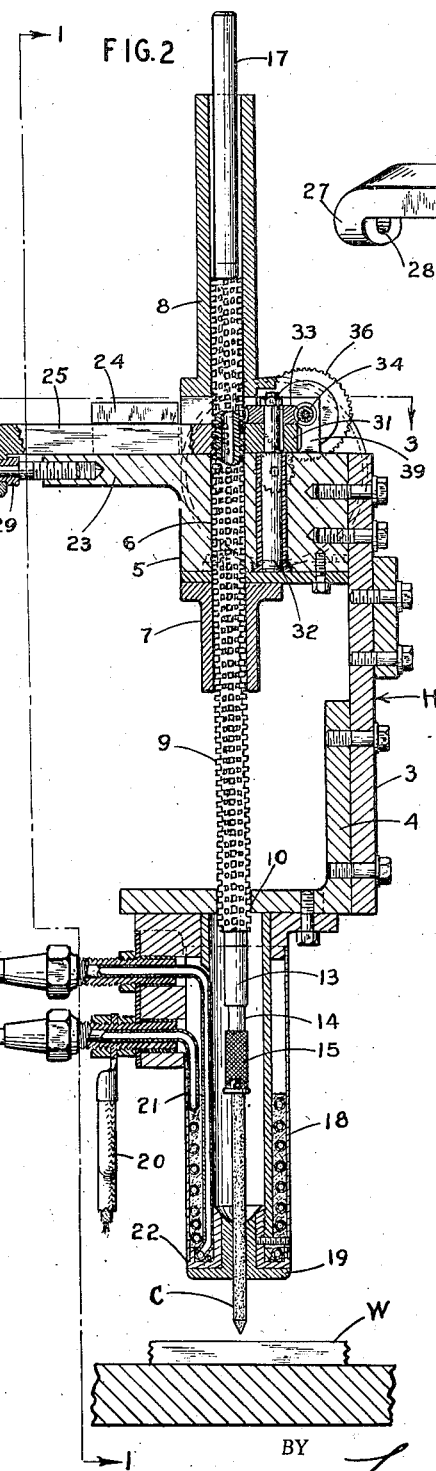
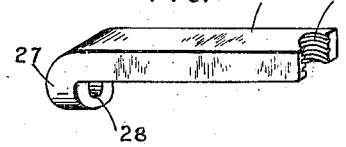
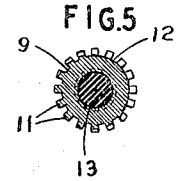
INVENTOR.
ALOIS P. DRDA
BY
ATTY.

March 27, 1945.  A. P. DRDA  2,372,261
METALLIC ARC WELDING
Filed July 16, 1941   3 Sheets-Sheet 3

INVENTOR.
ALOIS P. DRDA

Patented Mar. 27, 1945

2,372,261

UNITED STATES PATENT OFFICE 2,372,261

METALLIC ARC WELDING

Alois P. Drda, Medina, Ohio, assignor to The Midland Steel Products Company, Cleveland, Ohio, a corporation of Ohio Application July 16, 1941, Serial No. 402,588

6 Claims. (Cl. 74—22)

This invention relates to new and useful improvements in metallic arc welding and more particularly to an automatic arrangement for regulating fusible electrode and for automatically adjusting the length of the arc.

Another object of the invention is to simplify the mechanism for feeding the electrodes and adjusting the arc lengths; while providing means by which an electrode can be rapidly replaced with a new electrode after one has been consumed by the welding operation.

Other objects and advantages of the invention will become apparent during the course of the following description.

In the accompanying drawings forming a part of the application and wherein like numerals are employed to designate like parts throughout the several views:

Fig. 2 is a vertical section of the same taken on the line 2—2 of Fig. 1,

Fig. 4 is an enlarged side elevation of the carbon electrode holder with parts thereof broken away to illustrate its construction, Fig. 5 is a transverse section of the holder taken on the lines 5—5 of Fig. 4, Fig. 6 is an enlarged perspective view of the split nut used in the mechanism.

Figure 1:
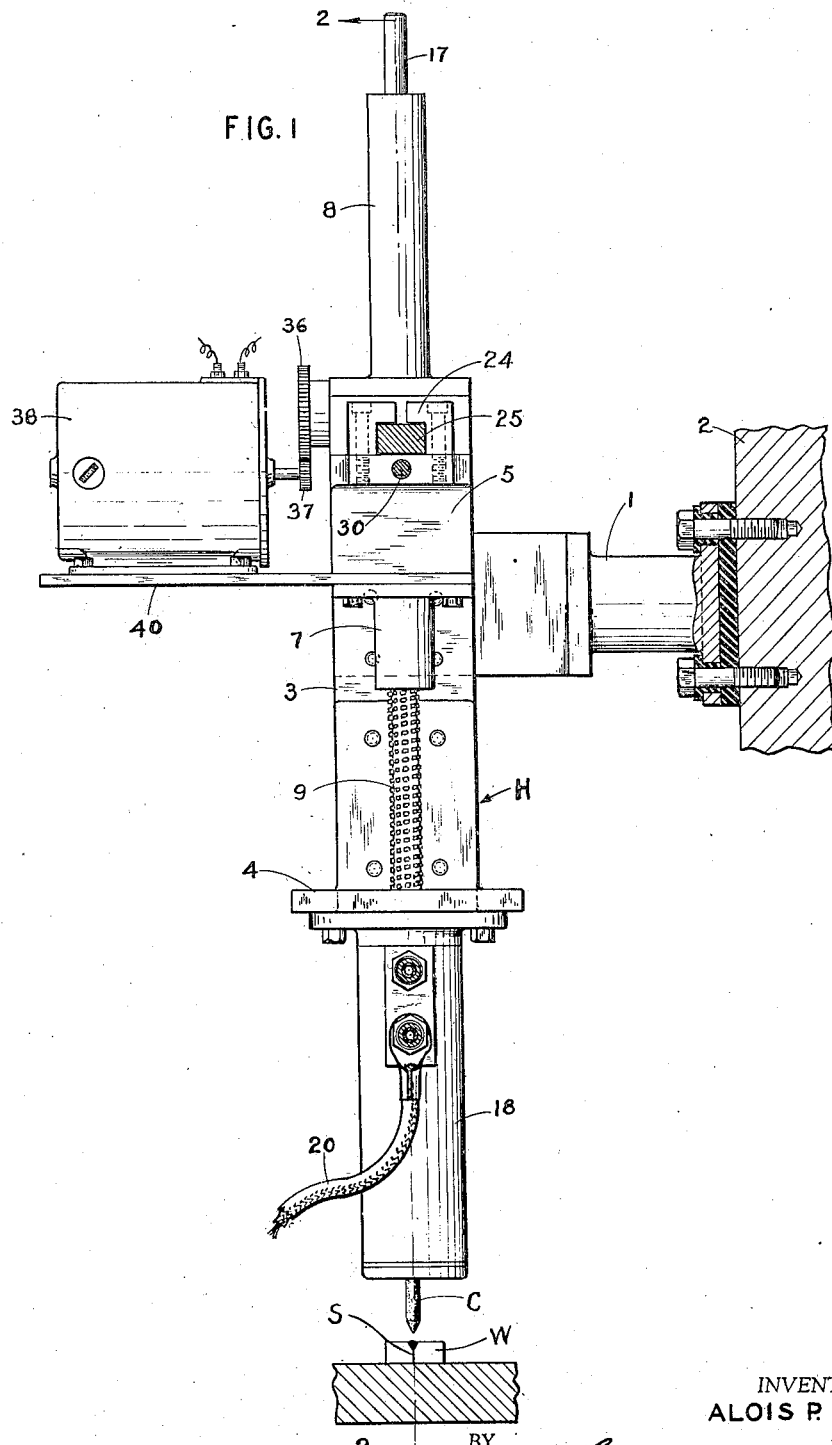
Fig. 1 is a side elevation of the welding mechanism.
Figure 3:
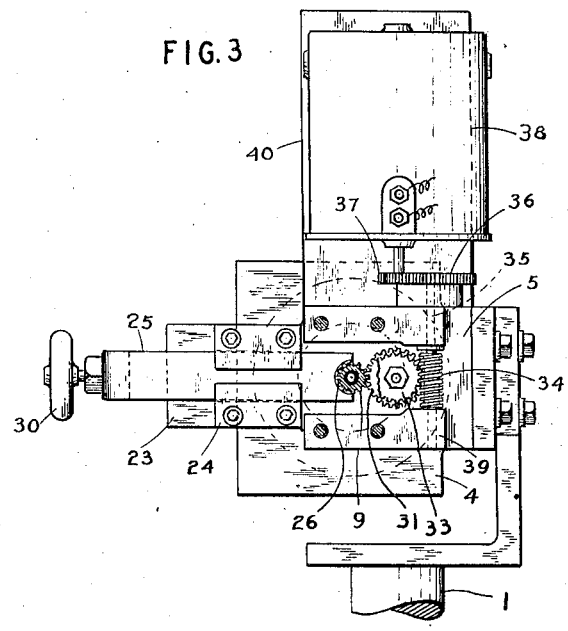
Fig. 3 is a transverse section taken on the line 3—3 of Fig. 2.

The principle of the invention is shown applied to carbon arc welding, and it will be understood that the invention is applicable to mechanical movements in general and to other types of welding wherein it is necessary to provide for electrode adjustments according to the voltage across the arc.

Referring now more particularly to the drawings, the reference character W designates the work pieces to be welded together along a longitudinal seam S by means of a carbon electrode C which may be caused to move lengthwise of the seam, or the work pieces W may be moved relative to and lengthwise under the electrode for laying a continuous weld lengthwise of the work. The carbon electrode C is supported above the work with a suitable bracket designated in its entirety by the letter H which is provided with a horizontal supporting arm 1 bolted to and insulated from a suitable support 2. In the event it is desired to operate upon stationary work, the support 1 of the bracket may be propelled upon the support 2 in any suitable manner to cause the carbon electrode to move lengthwise of the intended seam.

The bracket H comprises a back plate 3 having an L-shaped angle 4 bolted to its lower portion, while a block or head 5 is bolted to its upper portion. This head has a vertical opening 6 therethrough registering with the opening in a lower bearing sleeve 7 and the opening in an upper elongated sleeve 8.

A rotatable vertically adjustable electrode holder sleeve 9 is mounted in the opening 6 and aligned bearing sleeves 7 and 8 and its lower end extends through an opening 10 in the horizontal portion of the angle bracket 4 as best seen in Fig. 2. The exterior surface of the sleeve 9 is provided with radially extending ribs or spur gear teeth 11 which extend the full length thereof and are cut transversely throughout their entire length with a spiral thread 12. This formation of the outer circumference of the sleeve gives it the unique appearance of a multiplicity of small rhomboidal radial projections arranged in spiral rows as best seen in Fig. 4.

Opposite ends of this holder are internally screw threaded and into the lower end is threaded an axially extending insulator 13 having internal threads to receive an axially extending metallic chuck 14 for holding the axially extending carbon electrode C. This chuck 14 is provided with a longitudinally slidable sleeve 15 having a bayonet slot at one end whereby it may be locked after being grasped and turned on the chuck to move it longitudinally for opening or closing the spring jaws 16 which have in-turned ends to engage an annular groove in the upper end of the carbon electrode as illustrated in Fig. 4. Thus, after one electrode has been consumed in the welding operation, the butt end thereof may be readily removed from the holder and a new electrode inserted therein. Into the upper threaded end of the electrode holder 9 is threaded an axial extension 17 which is of such length that its upper end extends above the upper end of the upper bearing 8 when the electrode holder is in its lowermost position representing full consumption of the carbon electrode, whereby the holder may be grasped by the extension 17 and lifted vertically out of the support for replacement of the electrode.

Depending from the bracket 4 is an arc stabilizing unit 18, like that shown in the Peck Patent No. 1,840,601 granted January 12, 1932, axially through which projects the lower end of the electrode holder 9 and the carbon electrode C. The lower end of this arc stabilizing shield 18 is provided with an electrical contact piece 19 through which the lower end of the carbon electrode is slidably mounted and is negatively charged with current from the conductor 20 secured to a water cooling coil 21 coiled within the shield and having its lowermost convolution brazed or otherwise secured to the bottom 22 of the shield which is in electrical contact with the conductor 19.

It will of course be understood that the work W is positively charged so that when the welding current goes on, an arc will be drawn between the carbon electrode and the work. In order that the electrode may be automatically adjusted relative to the work depending upon the voltage across the arc, the head 5 is provided with a lateral extension 23 to which are bolted a pair of L-shaped guide blocks 24, between which a slidable bar 25 operates to be engaged with or disengaged from the electrode 9. The inner end of this bar 25 is formed with a half or split nut formation 26 so as to engage the threads 12 of the holder as shown in detail in Fig. 6. The outer end of the bar is angularly disposed as at 27 and is provided with an aperture 28 in which a bushing 29 is disposed for the reception of a hand screw 30 having its inner threaded end engaged with a threaded recess in the extension 23. By turning the hand screw 30 in one direction, the bar 25 is moved outwardly between its guide blocks 24 to disengage from the electrode holder, and when turned in the opposite direction, moves the split nut 26 into engagement with the threaded holder whereby rotation of the holder will cause the same, through its engagement with the split nut, to be moved in a direction depending upon the direction of turning of the holder as will be obvious.

For turning the electrode holder 9 in one direction or the other, a spur gear 31 is keyed to a vertical shaft 32 in the head 5 and meshes with the longitudinal ribs or spur gear teeth 11 of the holder. Also keyed upon the shaft 32 is a worm wheel 33 for meshing with a horizontal worm 34 keyed to a shaft 35 journaled in suitable bearings 39 on the head. A spur gear 36 is secured to the outer end of this shaft for mesh with a smaller spur gear 37 secured to the shaft of a reversible electric motor 38. This electric motor 38 is connected with the arc circuit so that it is driven in one direction whenever the arc voltage increases beyond a uniform operating point, and when the arc voltage decreases below such point, the reversible motor is driven in the opposite direction, whereby, through the train of gears and spur gear 31, the electrode holder 9 is turned in one direction on the other, enabling the split nut 26 to cause the holder to move up or down to adjust the arc length to the welding condition. Since the arc voltage is almost constantly changing, the holder 9 and carbon electrode are also kept in an almost constant state of oscillation to cause even consumption of the electrode and to aid in the steady operation of the arc. The motor 38 is supported upon a plate 40 which is secured between the head 5 and lower bearing 7.

It is to be understood that various changes in the size, shape and relation of parts may be resorted to without departing from the spirit of the invention or the scope of the appended claims.

I claim:

1. Means for rotating and reciprocating an element, an axially bodily movable elongated tube having its entire circumference provided with radial gear teeth extending the full length of the tube, a spiral thread cut into and across said gear teeth, a split nut engaging said thread, a drive spur gear meshing with said teeth for rotating the tube, and a reversible motor for rotating said spur gear in either direction.

2. Means for rotating and reciprocating an element, an axially bodily movable elongated tube having its entire circumference provided with radial gear teeth extending the full length of the tube, a spiral thread cut into and across said gear teeth, a slidable nut movable into and out of engagement with said thread, a drive spur gear meshing with said teeth for rotating the tube, and said tube being removable lengthwise when said nut is disengaged therefrom.

3. Means for rotating and reciprocating an element, a support having an opening, an elongated tube slidably and rotatably mounted in said opening and having its entire circumference provided with radial gear teeth extending lengthwise thereof whereby it can be rotated in and moved lengthwise through said opening, a thread cut into and across said gear teeth, a split nut removably engaging said thread, a drive spur gear meshing with said teeth for oscillating said tube in said opening whereby it is fed lengthwise as it is rotated, and a reversible motor for rotating said spur gear in either direction.

4. A device of the class described comprising a support having a plurality of openings arranged in a straight line and spaced from each other a distance no greater than the diameter of one of said openings, a tubular holder vertically, slidably and rotatably mounted in each opening and having the entire circumference provided with radial spur gear teeth extending the entire length of the holder, each holder also having a spiral thread cut into and across said longitudinally extending gear teeth, a separate gear meshing with the gear teeth of each holder for rotating the same, and a retractible finger adapted to engage said spiral thread of each holder to cause it to feed longitudinally as it is rotated, and when said finger is disengaged from said thread, the holder is free to slide longitudinally out of its opening in said support.

5. Means for rotating and moving an element lengthwise comprising a support having an opening therein, an elongated axially bodily movable cylindrical member having its entire circumference provided with radial gear teeth extending the full length of said member, said member being extended freely through said opening in said support for rotation and lengthwise movement and having a spiral thread cut into and across said gear teeth, a drive gear rotatably mounted upon said support and meshing with said gear teeth for rotating said member, and a movable finger mounted upon said support and being engageable with said thread to support said member in said opening and to cause it to move lengthwise through the same as it is rotated by said gear, and said finger being movable to disengage from said thread to free said member whereby it can be withdrawn from said opening.

6. Means for rotating and moving an element lengthwise comprising a support having a vertical opening of a depth to prevent wobbling of a cylindrical member therein, an elongated axially bodily movable cylindrical member having its entire circumference provided with radial gear teeth extending the full length of said member, said member being extended freely through said opening in said support for rotation and lengthwise movement and having a spiral thread cut into and across said gear teeth, a drive gear rotatably mounted upon said support and meshing with said gear teeth for rotating said member, and a stationary finger mounted upon said support and engaging said spiral thread for supporting said member in said opening causing said member to move lengthwise through said opening as it is simultaneously rotated by said gear, said finger being slidable to disengage from said thread to free said cylindrical member whereby it can be withdrawn longitudinally from said opening in said support.

ALOIS P. DRDA.